United States Patent
Choe et al.

(10) Patent No.: US 7,646,393 B2
(45) Date of Patent: Jan. 12, 2010

(54) APPARATUS AND METHOD FOR ADJUSTING PRIMARY COLOR COMPONENT OF IMAGE, AND COMPUTER-READABLE RECORDING MEDIA FOR STORING COMPUTER PROGRAM

(75) Inventors: Wonhee Choe, Gyeongiu-si (KR); Dusik Park, Suwon-si (KR); Changyeong Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 821 days.

(21) Appl. No.: 11/118,482

(22) Filed: May 2, 2005

(65) Prior Publication Data

US 2005/0248581 A1 Nov. 10, 2005

(30) Foreign Application Priority Data

May 6, 2004 (KR) .................. 10-2004-0031673

(51) Int. Cl.
  *G09G 5/02* (2006.01)
(52) U.S. Cl. .......... 345/604; 345/589; 345/600; 382/162; 382/167
(58) Field of Classification Search .......... 345/600
  See application file for complete search history.

(56) References Cited

U.S. PATENT DOCUMENTS

| | | | |
|---|---|---|---|
| 4,845,550 A | | 7/1989 | Urabe et al. |
| 5,384,601 A | | 1/1995 | Yamashita et al. |
| 5,502,642 A | * | 3/1996 | Dichter ............ 702/127 |
| 5,612,792 A | * | 3/1997 | Ichikawa et al. ...... 358/500 |
| 6,034,655 A | | 3/2000 | You ................. 345/60 |
| 6,057,931 A | | 5/2000 | McConnell et al. ..... 358/1.9 |
| 6,122,012 A | | 9/2000 | Segman .............. 348/576 |
| 6,229,590 B1 | | 5/2001 | Bannai et al. |
| 6,337,692 B1 | * | 1/2002 | Rai et al. ........... 345/594 |
| 6,474,877 B1 | | 11/2002 | Shahid .............. 348/650 |
| 6,476,877 B2 | | 11/2002 | Kihara et al. |
| 6,814,420 B2 | * | 11/2004 | Fujita et al. ......... 347/15 |
| 6,944,331 B2 | * | 9/2005 | Schmidt et al. ....... 382/165 |

(Continued)

FOREIGN PATENT DOCUMENTS

JP  5-244406  9/1993

OTHER PUBLICATIONS

European Search Report for corresponding EP Application 05252743 mailed Jun. 27, 2007.

*Primary Examiner*—M Good Johnson
(74) *Attorney, Agent, or Firm*—Staas & Halsey LLP (57) ABSTRACT

An apparatus for and a method of adjusting a primary color component of an image and a computer-readable recording medium for storing a computer program for controlling the apparatus. The apparatus includes: a weight determiner which determines a weight corresponding to a hue difference between a hue of each of plural object hue components and a hue of adjustment primary color; and a component adjuster which adjusts at least one of object hue and saturation components using at least one of saturation and hue adjustment amounts of the adjustment primary color and the weight. The object hue and saturation components are components of hue and saturation components of an input image belonging to an adjustment range, the adjustment range belongs to a region of a color space in which color interference between the adjustment primary color and a neighboring primary color occurs, the adjustment primary color corresponds to a primary color to be adjusted, and the neighboring primary color corresponds to a primary color neighboring the adjustment primary color.

21 Claims, 4 Drawing Sheets

U.S. PATENT DOCUMENTS

| | | | |
|---|---|---|---|
| 6,947,594 B2 * | 9/2005 | Watanabe et al. | 382/167 |
| 7,190,830 B2 * | 3/2007 | Yamazoe et al. | 382/167 |
| 7,333,237 B2 * | 2/2008 | Ogatsu et al. | 358/1.9 |
| 2001/0003456 A1 | 6/2001 | Kagawa et al. | |
| 2001/0043368 A1 | 11/2001 | Morikawa | |
| 2004/0042662 A1 * | 3/2004 | Wilensky et al. | 382/194 |

\* cited by examiner

APPARATUS AND METHOD FOR ADJUSTING PRIMARY COLOR COMPONENT OF IMAGE, AND COMPUTER-READABLE RECORDING MEDIA FOR STORING COMPUTER PROGRAM

CROSS-REFERENCE TO RELATED APPLICATION

This application claims the priority of Korean Patent Application No. 2004-0031673, filed on May 6, 2004, in the Korean Intellectual Property Office, the disclosure of which is incorporated herein in its entirety by reference.

BACKGROUND OF THE INVENTION

1. Field of the Invention

The present invention relates to the field of processing of a color image like a color image editing tool, a liquid crystal display (LCD), a differential scanning calorimeter DSC, or a printer, and more particularly to, an apparatus and method for adjusting a primary color component of an image and a computer-readable recording medium for storing a computer program for controlling the apparatus.

2. Description of Related Art

In general, display devices having different color representation characteristics display an image with different colors. Display devices having the same color representation characteristics also display an image with different colors. This is because even display devices having the same color representation characteristics include components having different color representation characteristics. A primary color component of an image needs to be adjusted in order to remove the discrepancy of colors displayed by such display devices or represent an image with a user's preferred specific color.

U.S. Pat. Nos. 6,034,655, 6,057,931, 6,122,012, and 6,476,877 disclose conventional techniques for controlling a color component of an image. In these conventional techniques, hue and saturation components are adjusted only for a primary color to be adjusted without considering color interference between the primary color and a neighboring primary color. This causes the discontinuation of color representation.

BRIEF SUMMARY

An aspect of the present invention provides an apparatus for adjusting a primary color component of an image by adjusting at least one of hue and saturation components of primary colors in the image in consideration of interferences and effects among the primary colors.

An aspect of the present invention also provides a method of adjusting a primary color component of an image by adjusting at least one of hue and saturation components of primary colors in the image in consideration of interferences and effects among the primary colors.

An aspect of the present invention also provides a computer-readable recording medium for storing a computer program for controlling the apparatus.

According to an aspect of the present invention, there is provided an apparatus for adjusting a primary color component of an image, including: a weight determiner which determines a weight corresponding to a hue difference between a hue of each of plural object hue components and a hue of adjustment primary color; and a component adjuster which adjusts at least one of object hue and saturation components using at least one of saturation and hue adjustment amounts of the adjustment primary color and the weight.

The object hue and saturation components are hue and saturation components of an input image belonging to an adjustment range, the adjustment range belongs to a region of a color space in which color interference between the adjustment primary color and a neighboring primary color occurs, the adjustment primary color corresponds to a primary color to be adjusted, and the neighboring primary color corresponds to a primary color neighboring the adjustment primary color.

According to another aspect of the present invention, there is provided a method of adjusting a primary color of an image, including: determining a weight corresponding to a hue difference between a hue of each of plural object hue components and a hue of adjustment primary color; and adjusting at least one of object hue and saturation components using at least one of saturation and hue adjustment amounts of the adjustment primary color and the weight.

According to still another aspect of the present invention, there is provided a computer-readable recording medium storing a computer program which causes a processor to perform a method to control an apparatus for adjusting saturation and hue components of an input image.

According to yet another aspect of the present invention, there is provided an apparatus for preventing color representation error when an object saturation of an input image is achromatic or has a neighboring value, including: a weight determiner which determines a weight corresponding to a hue difference between a hue of each of plural object hue components and a hue of an adjustment primary color; and a component adjuster which adjusts at least one of the object hue components and a saturation component using at least one of a saturation adjustment amount and a hue adjustment amount of the at least one adjustment primary color and the weight. The object hue and saturation components are hue and saturation components of an input image belonging to an adjustment range of a region of a color space in which color interference between the adjustment primary color and a neighboring primary color occurs, the adjustment primary color corresponds to a primary color to be adjusted, and the neighboring primary color corresponds to a primary color neighboring the adjustment primary color.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENT

Reference will now be made in detail to an embodiment of the present invention, examples of which are illustrated in the accompanying drawings, wherein like reference numerals refer to the like elements throughout. The embodiment is described below in order to explain the present invention by referring to the figures.

Figure 1:
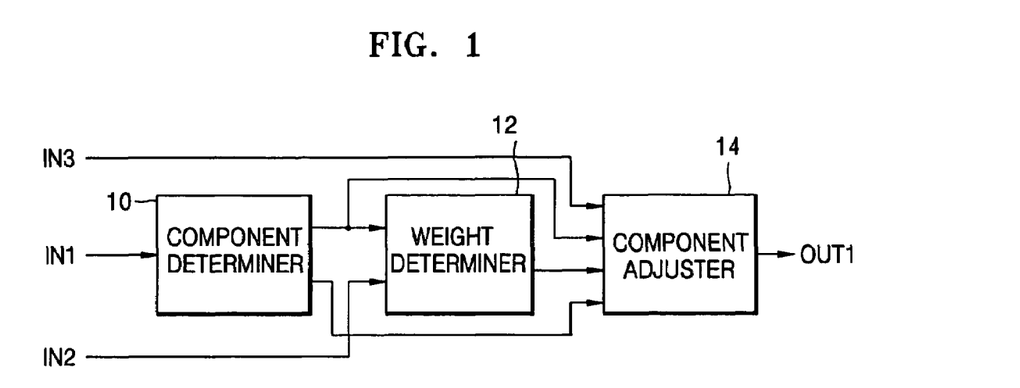
FIG. 1 is a block diagram of an apparatus for adjusting a primary color component of an image, according to an embodiment of the present invention.

FIG. 1 is a block diagram of an apparatus for adjusting a primary color component of an image, according to an embodiment of the present invention. Referring to FIG. 1, the apparatus includes a component determiner 10, a weight determiner 12, and a component adjuster 14.

Figure 2:
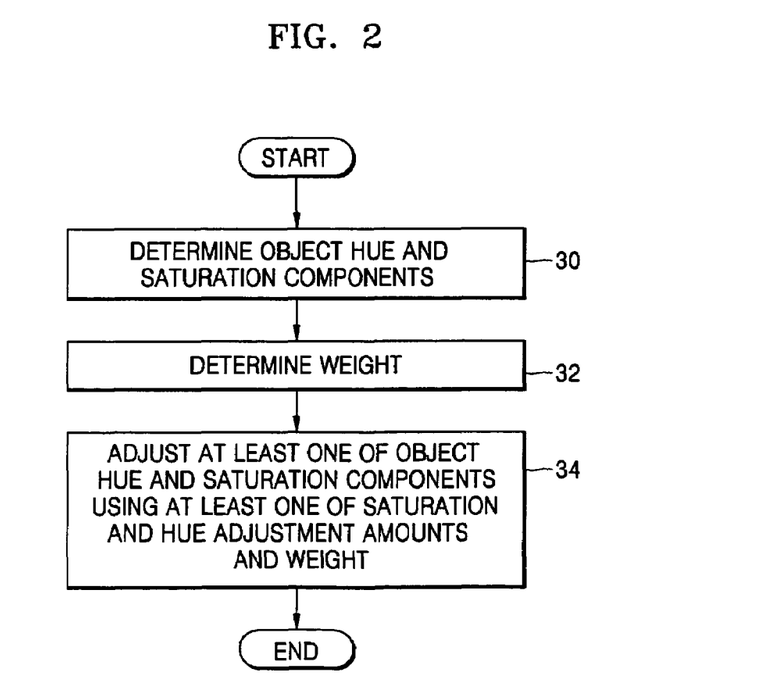
FIG. 2 is a flowchart for explaining a method of adjusting a primary color component of an image, according to an embodiment of the present invention.

FIG. 2 is a flowchart of a method of adjusting a primary color component of an image, according to an embodiment of the present invention. The subject method may be performed by the apparatus of FIG. 1 and is, for ease of explanation only, described in conjunction with that figure.

Referring to FIGS. 1 and 2, the method includes an operation 30 of determining object hue and saturation components, an operation 32 of determining a weight, and an operation 34 of adjusting at least one of the object hue and saturation components using the weight.

In operation 30, the component determiner 10 of FIG. 1 extracts hue and saturation components from color information of an image input via an input node IN1, selects object hue and saturation components from the extracted hue and saturation components, and outputs the object hue and saturation components. Here, the object hue component is referred to as a hue component belonging to an adjustment range among the hue components extracted from the color information as to the input image, and the object saturation component is referred to as a saturation component belonging to the adjustment range among the saturation components extracted from the color information as to the input image. The adjustment range is determined by a user in a region of a color space in which color interference between an adjustment primary color and a neighboring primary color occurs, i.e., a region which is affected by a synthesized color of adjustment primary colors, or may vary later. The adjustment primary color corresponds to a primary color requested to be adjusted, and the neighboring primary color corresponds to a primary color adjacent to the adjustment primary color.

Figure 3:
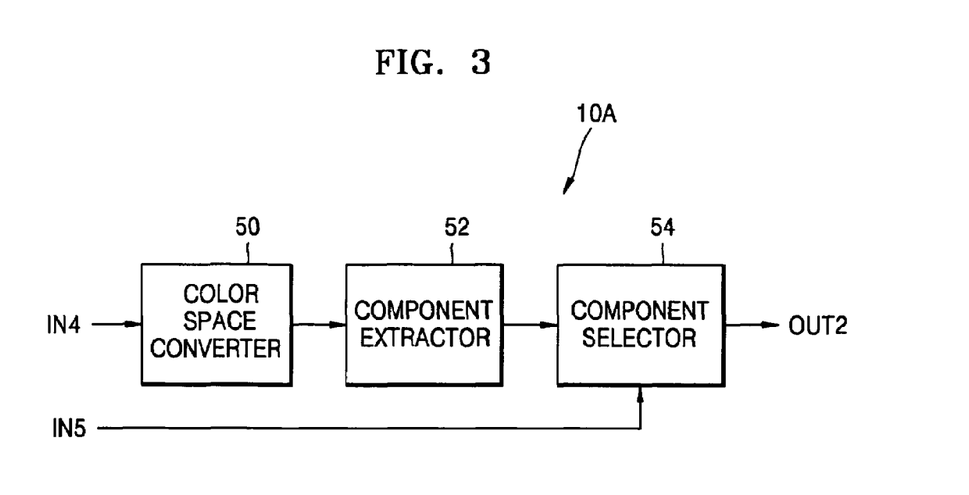
FIG. 3 is a block diagram of an example of the component determiner of FIG. 1, according to an embodiment of the present invention.

According to the present embodiment, a primary color may be red (R), green (G), blue (B), cyan (C), magenta (M), or yellow (Y) or may be one of combinations of R, G, B, C, M, and Y FIG. 3 is a block diagram of an example 10A of the component determiner 10 of FIG. 1, including a color space converter 50, a component extractor 52, and a component selector 54.

The color space converter 50 of the component determiner 10A of FIG. 3 converts an RGB color space, in which color information as to an image input via an input node IN4 is represented, into another type of color space and outputs the color information represented in the converted space to the component extractor 52. The conversion of the RGB color space in which the color information is represented into another type of color space via the color space converter 50 is performed to extract hue and saturation components from the color information. Here, another type of color space can be a color space in which the saturation and hue of the input image can be extracted. For example, another type of color space can be hue, saturation, and brightness (HSV) color space or luminance and chrominance (YCbCr) color space.

Figure 4:
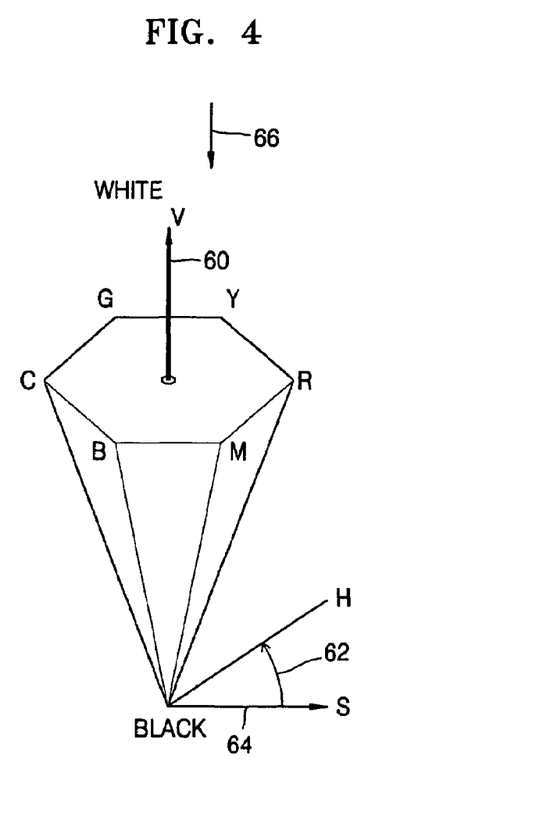
FIG. 4 is a view for showing a 3-dimensional hue (H), saturation (S), and value (V) color space as a 2-dimensional color space.

FIG. 4 is a view showing a 3-dimensional HSV color space as a 2-dimensional color space to show hue (H), saturation (S), and lightness (V).

For example, the color space converter 50 of FIG. 3 converts an RGB color space in which color information is represented into a HSL color space, YCbCr color space or the HSV color space of FIG. 4. Lightness increases toward direction indicated by an arrow 60 of FIG. 4, a hue varies toward direction indicated by an arrow 62, and saturation increases toward direction indicated by an arrow 64.

The component extractor 52 of FIG. 3 extracts hue and saturation components from the color information represented in the RGB color space converted by the color space converter 50 and outputs the hue and saturation components to the component selector 54.

The component selector 54 selects object hue and saturation components, which belong to an adjustment range and are input via an input node IN5, from the hue and saturation components extracted by the component extractor 52 and outputs the selected object hue and saturation components via an output node OUT2. When a plurality of adjustment ranges exist, the component selector 54 selects object hue and saturation components belonging to each of the plurality of adjustment ranges.

After operation 30, in operation 32, the weight determiner 12 of FIG. 1 determines a weight corresponding to a hue difference between a hue of the object hue component input from the component determiner 10 and a hue of an adjustment primary color input via an input node IN2 and outputs the weight to the component adjuster 14. Here, the hue can mean color angle. If a plurality of adjustment ranges are input to the component selector 54 of FIG. 3 via the input node IN5 and the component selector 54 selects a plurality of object hue components and a plurality of object saturation components, the weight determiner 12 determines a weight corresponding to a hue difference between a hue of each of object hue components belonging to each of the adjustment ranges and a hue of an adjustment primary color corresponding to the object hue component, for each adjustment range.

Hereinafter, for ease of explanation of the apparatus of FIG. 1, it is presumed that the color space converter 50 converts the color information represented in an RGB color space into that represented in an HSV color space and a primary color is red (R), green (G), blue (B), cyan (C), magenta (M), or yellow (Y). However, it is to be understood that this is only a non-limiting example and that the present embodiment is not limited to this presumption.

Figure 5:
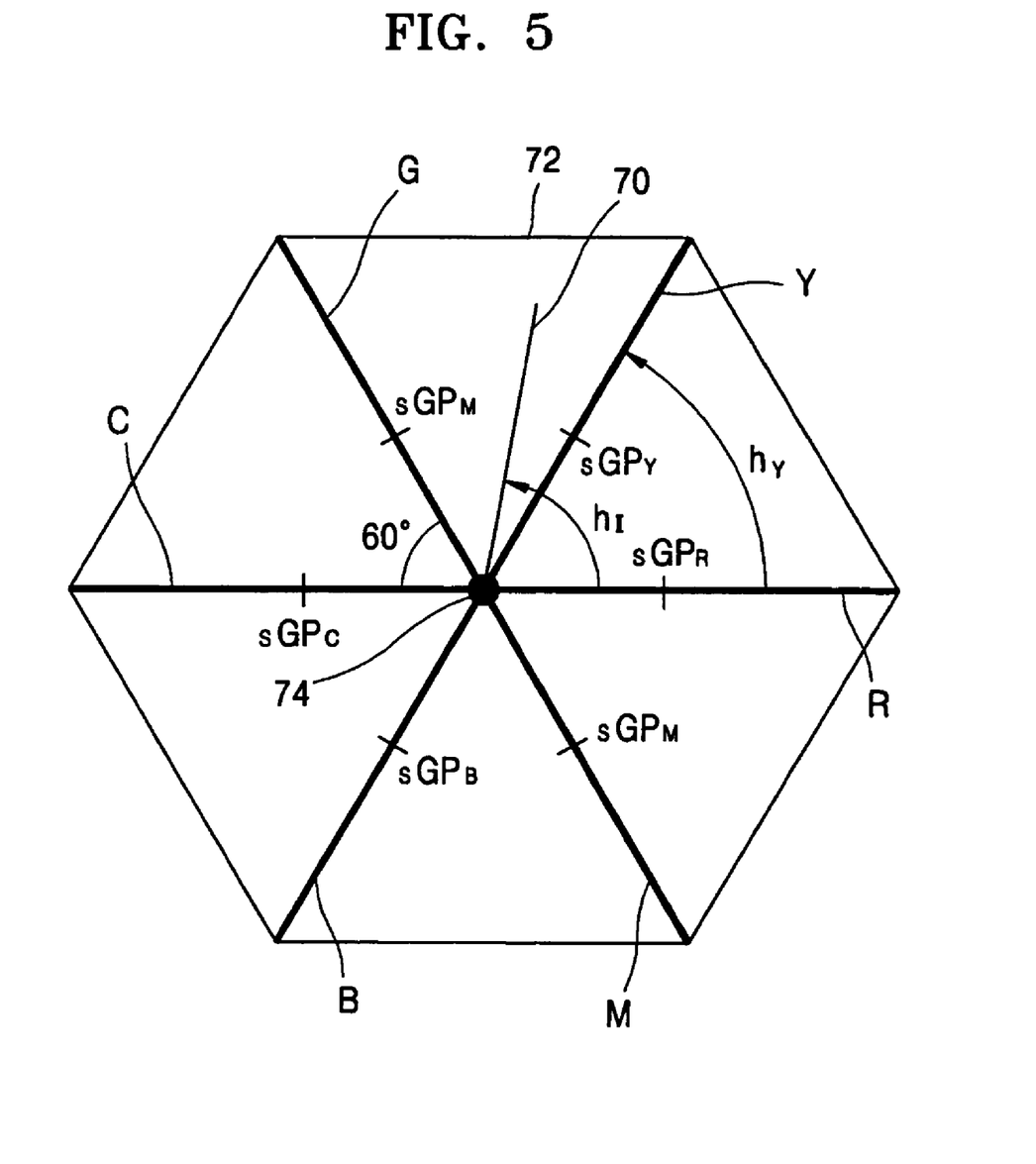
FIG. 5 is a view for differently showing the HSV color space of FIG. 4.

FIG. 5 is a view for showing the HSV color space of FIG. 4 from a direction indicated by an arrow 66. Here, hues and the magnitudes of saturations are 2-dimensionally represented. It is presumed that the basis of the hues is an R color, i.e., a hue $h_R$ of a primary color R is 0°, the hues increase counterclockwise, and the saturations increase from a center 74 outward.

For example, when an adjustment primary color that is a primary color a user desires to adjust is Y and color information 70 including object hue and saturation components determined by the component determiner 10 is as shown in FIG. 5, the weight determiner 12 determines a weight corresponding to a hue difference between a hue $h_I$ of an object hue component to be adjusted and a hue $h_{I'}$ of an adjustment primary color corresponding to the object hue component.

As shown in FIG. 5, primary colors have a hue difference of 60°. In other words, the primary colors are spaced apart from one another at a hue of 60°. In this case, a region in which color interferences between a primary color and neighboring primary colors occur is within the range of ±60° based on the primary color. This means that a section, which is affected by the adjustment of a saturation or hue of color information belonging to a section within the range of ±60° based on a primary color, is within the range of ±60° based on the primary color. Thus, the above-described adjustment range may be determined within the range of 120° based on the primary color.

Figure 6:
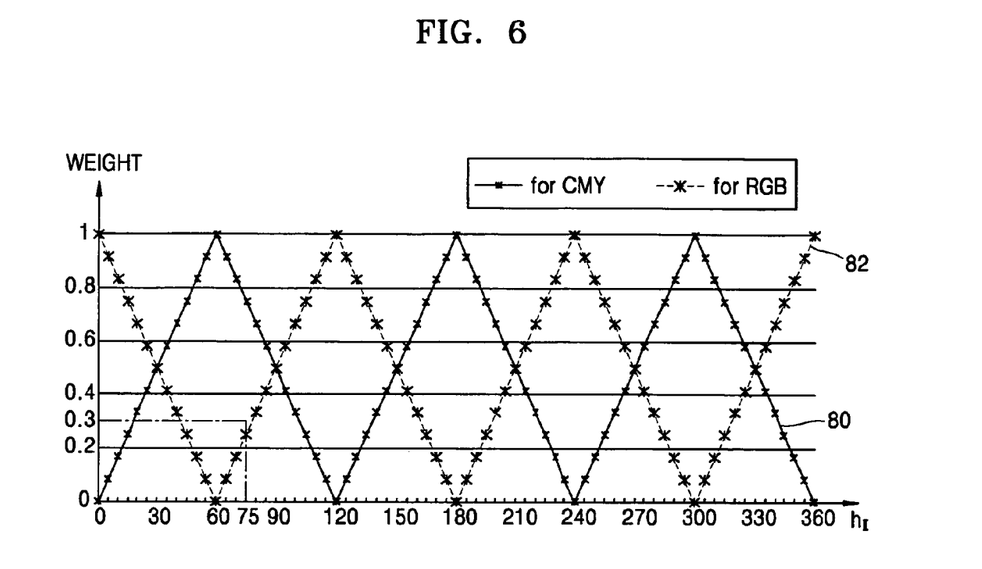
FIG. 6 is a graph for exemplarily showing a weight with respect to an angle that is, hue of an object hue component to be adjusted, according to an embodiment of the present invention.

FIG. 6 is a graph for exemplarily showing a weight with respect to a hue hi of an object hue component to be adjusted, according to an embodiment of the present invention. The horizontal axis denotes the hue $h_I$, and the vertical axis denotes the weight. Here, a maximum value of the weight is set to "1", and a weight of each primary color is set to "1". In other words, when an adjustment primary color is C, M, or Y, a weight of each of adjustment primary colors C, M, and Y is "1" and a weight of each of neighboring primary colors R, G, and B is "0" in a line graph 80 used to calculate a weight. Also, when the adjustment primary color is R, G, or B, a weight of each of the adjustment primary colors R, G, and B is "1" and a weight of each of neighboring primary colors C, M, and Y is "0" in a line graph 82 used to calculate a weight.

The weight determiner 12 may determine that the smaller an absolute value of a hue difference between a hue of an object hue component and a hue of an adjustment primary color becomes, the larger a weight becomes or may be determine that the larger the absolute value of the hue difference becomes, the smaller the weight becomes. In this case, as shown in FIG. 6, the weight may vary depending on the type of adjustment primary color and the hue $h_I$ of the object hue component. For example, referring to FIGS. 5 and 6, when an adjustment primary color is R, G, or B and the hue $h_I$ of the object hue component of the color information 70 is 75°, a weight is determined to be 0.3.

For example, the weight determiner 12 determines a weight $W_1$ using Equation 1 when an adjustment primary color is R, G, or B and determines a weight $W_2$ using Equation 2 when the adjustment primary color is C, M, or Y.

$$W_1 = k - l2kx\left(\frac{h_I + \theta}{2\theta} - \text{round}\left(\frac{h_I + \theta}{2\theta}\right)\right) - kl \quad (1)$$

$$W_2 = k - l2kx\left(\frac{h_I}{2\theta} - \text{round}\left(\frac{h_I}{2\theta}\right)\right) - kl \quad (2)$$

In Equations (1) and (2), k denotes a maximum value of a weight, for example, may be "1" as shown in FIG. 6, 2θ denotes an angle that is, hue of an adjustment range, and round(x) denotes a value obtained by removing a value less than a decimal point from x. Here, according to the present invention, $W_1 + W_2$ may be "1".

As described above, as shown in FIG. 1, the apparatus for adjusting the primary color component of the image may include the component determiner 10, the weight determiner 12, and the component adjuster 14.

However, in an alternative embodiment, the apparatus may include only the weight determiner 12 and the component adjuster 14. In this case, the weight determiner 12 receives object hue and saturation components, which have been extracted in advance and selected from color information, from an external source via the input node IN2.

After operation 32, in operation 34, the component adjuster 14 of FIG. 1 adjusts at least one of the object hue and saturation components using at least one of hue and saturation adjustment amounts of at least one adjustment primary color input via an input node IN3 and the weight input from the weight determiner 12 and outputs the adjustment result via an output node OUT1. For example, the component adjuster 14 adjusts the object saturation component using the saturation adjustment amount of the adjustment primary color and the weight, adjusts the object hue component using the hue adjustment amount of the adjustment primary color and the weight, and outputs the adjustment results via the output node OUT1. Here, the weights used for adjusting the object saturation and hue components may be the same and calculated as in Equation (1) or (2) according to the type of adjustment primary color, as previously described.

Here, the saturation and hue adjustment amounts are determined together with the adjustment primary color in each adjustment range by a user. For example, when the user desires to adjust a component of one primary color, the user determines an adjustment primary color, an adjustment range 2θ of the adjustment primary color, and saturation adjustment amount and/or hue adjustment amount of the adjustment primary color.

According to the present embodiment, the component adjuster 14 may adjust the object saturation component up to a maximum saturation k and the object hue component up to the adjustment primary color or the neighboring primary color. For example, the component adjuster 14 may adjust the object saturation component of the color information 70 of FIG. 5 up to a maximum saturation 72 and the object hue component of the color information 70 up to the adjustment primary color Y or G.

Figure 7:
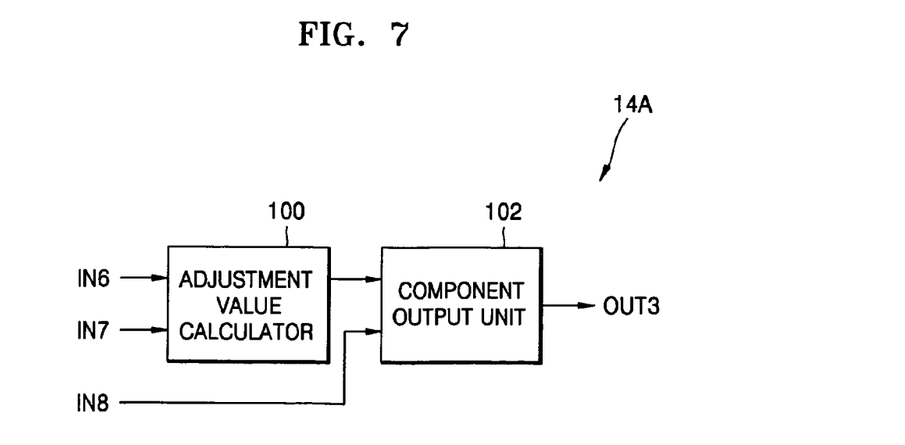
FIG. 7 is a block diagram of an example of the component adjuster of FIG. 1, according to an embodiment of the present invention.

FIG. 7 is a block diagram of an example 14A of the component adjuster 14 of FIG. 1, including an adjustment value calculator 100 and a component output unit 102.

The adjustment value calculator 100 of FIG. 7 calculates at least one of saturation and hue adjustment values using at least one of saturation and hue adjustment amounts of an adjustment primary color input via an input node IN6 and the weight input from the weight determiner 12 via an input node IN7 and outputs at least one of the calculated saturation and hue adjustment values to the component output unit 102.

For example, the adjustment value calculator 100 may calculate a saturation adjustment value $DELTA_s$ using Equation (3) and a hue adjustment value $DELTA_h$ using Equation (4).

$$DELTA_s = \Delta s_1 x W_1 + \Delta s_2 x W_2 \quad (3)$$

$$DELTA_h = \Delta h_1 x W_1 + \Delta h_2 x W_2 \quad (4)$$

In these equations, when the adjustment primary color is R, G, or B, $\Delta s_1$ denotes the saturation adjustment amount of the adjustment primary color, $\Delta h_1$ denotes the hue adjustment amount of the adjustment primary color, and $W_1$ denotes, for example, the weight calculated as in Equation (1). When the adjustment primary color is C, M, or Y, $\Delta s_2$ denotes the saturation adjustment amount of the adjustment primary color, $\Delta h_2$ denotes the hue adjustment amount of the adjustment primary color, and $W_2$ denotes, for example, the weight calculated as in Equation (2). Thus, when the adjustment primary color is only R, G, or B, $\Delta s_2$, $\Delta h_2$, and $W_2$ are "0". When the adjustment primary color is only C, M, or Y, $\Delta s_2$, $\Delta h_2$, and $W_2$ are "0". However, when a plurality of adjustment primary colors include one of R, G, and B and one of C, M, and Y, $\Delta s_2$, $\Delta h_2$, $W_2$, $\Delta s_1$, $\Delta h_1$, and $W_1$ each have a non-zero value.

The component output unit 102 of FIG. 7 adjusts at least one of object hue and saturation components input via an input node IN8 using at least one of the saturation and hue adjustment values input from the adjustment value calculator 100 and outputs the adjustment result via an output node OUT3.

For example, the component output unit 102 adjusts an object saturation component $s_I$ to be adjusted using Equation (5) and an object hue component $h_I$ to be adjusted using Equation (6).

$$s_o = s_I + DELTA_s x (1-s_I) \quad (5)$$

$$h_o = DELTA_h x \theta + h_I \quad (6)$$

In these equations, $s_O$ denotes an adjusted object saturation component, and $h_O$ denotes an adjusted object hue component.

Meanwhile, when saturation is achromatic or has a neighboring value, an excessive adjustment of an object saturation component may cause a color representation error to occur. To prevent this color representation error, the component adjuster 14 of FIG. 1 may adjust a saturation of an object saturation component depending on whether the object saturation component belongs to a low or high saturation region. For example, the component adjuster 14 adjusts the object saturation component $s_I$ to be adjusted in the low saturation region in which the object saturation component $s_I$ is smaller than a predetermined threshold sGP using Equation (7) or in the high saturation region in which the object saturation component $s_I$ is equal to or larger than the predetermined threshold sGP using Equation (8).

$$s_o = s_I + DELTA_s x (1 - s_I), \text{ if } s_I < sGP \quad (7)$$

$$s_o = s_I + DELTA_s x (1 - s_I) x \left( \frac{s_I}{sGP} \right), \text{ if } s_I \geq sGP \quad (8)$$

In these equations, $s_O$ denotes an adjusted object saturation component, and sGP may be, for example, 0.5 and may be determined as $sGP1_R$, $sGP1_Y$, $sGP1_G$, $sGP1_C$, $sGP1_B$, or $sGP1_M$ according to the type of adjustment primary color as shown in FIG. 5.

A described above, the component adjuster 14 may adjust an object saturation component input from the component determiner 10 depending on whether the object saturation component belongs to a low or high saturation region. For example, $s_I$ of Equations (7) or (8) may be an object saturation component input to the component adjuster 14, and $s_O$ of Equations (7) or (8) may an object saturation component input to the component output unit 102.

Also as described above, the component adjuster 14 may adjust an adjusted object saturation component output from the component output unit 102 depending on whether the adjusted object saturation component belongs to a low or high saturation region. For example, $s_I$ of Equations (7) or (8) may be an object saturation component output from the component output unit 102, and $s_O$ of Equations (7) or (8) may be an object saturation component output to the component adjuster 14.

Color information including object saturation and hue components adjusted by the component adjuster 14 of FIG. 1 may be converted into various forms. For example, when an input image is to be recorded, color information output from the component adjuster 14 may be converted into a form suitable for recording the input image. When the input image is to be displayed, the color information output from the component adjuster 14 may be converted into a form suitable for displaying the input image.

When a plurality of adjustment ranges are input from an external source as described above, the weight determiner 12 determines a weight in each of the plurality of adjustment ranges as described above. Here, the component adjuster 14 adjusts object hue and saturation components in each of the plurality of adjustment ranges.

In accordance with the above-described embodiment, in an apparatus and method for adjusting a primary color component of an image, and a computer-readable recording medium for storing a computer program for controlling the apparatus, at least one of hue and saturation components of an input image can be adjusted in an adjustment range belonging to a region in which color interference between an adjustment primary color and a neighboring primary color occurs. Thus, the discontinuation of color representation can be solved, color differences displayed by different types of display devices having different color representation characteristics can be better compensated, and a user can convert a specific color in the image into a desired color. In particular, a color of a background represented with a specific color can be removed from the image or replaced with another type of color, using the present invention. Moreover, low and high saturation regions can be classified to adjust object saturation components. As a result, a color representation error occurring when an object saturation component is achromatic or has a neighboring value can be prevented in advance so as to maintain naturalness between an object saturation component to be adjusted and an adjusted object saturation component.

Embodiments of the invention can also be realized as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices. The computer readable recording medium can also be distributed over network coupled computer systems so that the computer readable code is stored and executed in a distributed fashion.

Although an embodiment of the present invention have been shown and described, the present invention is not limited to the described embodiment. Instead, it would be appreciated by those skilled in the art that changes may be made to the embodiment without departing from the principles and spirit of the invention, the scope of which is defined by the claims and their equivalents

What is claimed is:

1. An apparatus for adjusting a primary color component of an image, comprising:
    a weight determiner which determines a weight based on a determined hue difference between a hue of each of plural object hue components and a hue of an adjustment primary color; and
    a component adjuster which adjusts at least one of the object hue components and a saturation component using at least one of a saturation adjustment amount and a hue adjustment amount of the adjustment primary color and the weight,
    wherein the object hue and saturation components are hue and saturation components of an input image belonging to an adjustment range, the adjustment range belongs to a region of a color space in which color interference between the adjustment primary color and a neighboring primary color occurs, the adjustment primary color corresponds to a primary color to be adjusted, and the neighboring primary color corresponds to a primary color neighboring the adjustment primary color, wherein, in the determining of the weight, a determined weight based on an absolute value of a first hue difference is determined to affect adjustment of the at least one object hue components and the saturation component more than an adjustment affect of a determined weight based on an absolute value of a second hue difference when the absolute value of the first hue difference is less than the absolute value of the second hue difference.

2. The apparatus of claim 1, wherein the adjustment range is predetermined by a user or adjusted later on, and the number of the adjustment range is 1 or over.

3. The apparatus of claim 1, wherein the primary color is one of red (R), green (G), blue (B), cyan (C), magenta (M), or yellow (Y) or a combination of any of R, G, B, C, M, and Y.

4. The apparatus of claim 1, wherein the component adjuster adjusts the object saturation component up to a maximum saturation and the object hue component up to one of the adjustment primary color or the neighboring primary color.

5. The apparatus of claim 1, further comprising:
a component determiner which extracts the hue and saturation components from color information of the input image and selects the object hue and saturation components from the extracted hue and saturation components.

6. The apparatus of claim 5, wherein the component determiner includes:
a color space converter which converts a specified color space in which the color information is represented into another type of color space;
a component extractor which extracts the hue and saturation components from the color information which has been represented in the converted specified color space; and
a component selector which selects the object hue and saturation components belonging to the adjustment range from the extracted hue and saturation components and outputs the selected object hue and saturation components.

7. The apparatus of claim 6, wherein the another type of color space is a color space in which the saturation and hue are extracted from the input image.

8. The apparatus of claim 6, wherein the specified color space is one of an RGB color space, a hue, saturation, and lightness (HSV) color space, or a luminance and chrominance (YCbCr) color space and the another type of color space is another of the RGB color space, the HSV color space, or the YCbCr color space.

9. The apparatus of claim 1, wherein the weight determiner determines that the smaller an absolute value of the hue difference becomes, the larger the weight becomes or the larger the absolute value of the hue difference becomes, the smaller the weight becomes.

10. The apparatus of claim 9, wherein the weight determiner determines weights using one of the following equations:

$$W_1 = k - l2kx\left(\frac{h_I + \theta}{2\theta} - \text{round}\left(\frac{h_I + \theta}{2\theta}\right)\right) - kl; \text{ or}$$

$$W_2 = k - l2kx\left(\frac{h_I}{2\theta} - \text{round}\left(\frac{h_I}{2\theta}\right)\right) - kl,$$

wherein $W_1$ denotes a weight determined when the adjustment primary color is one of R, G, and B, $W_2$ denotes a weight determined when the at least one adjustment primary color is one of C, M, and Y, k denotes a maximum value of the weights, $2\theta$ denotes an angle of the adjustment range, $h_I$ denotes a hue of the object hue component to be adjusted, and round(x) denotes a value obtained by removing a value less than a decimal point from x.

11. The apparatus of claim 10, wherein the component adjuster includes:
an adjustment value calculator which calculates at least one of saturation and hue adjustment values using at least one of the saturation and hue adjustment amounts and the weight; and
a component output unit which adjusts at least one of the object hue and saturation components using at least one of the saturation and hue adjustment values.

12. The apparatus of claim 11, wherein the adjustment value calculator calculates the saturation and hue adjustment values using the one of the following equations:

$\text{DELTA}_S = \Delta s_1 x W_1 + \Delta s_2 x W_2$; and $\text{DELTA}_h = \Delta h_1 x W_1 + \Delta h_2 x W_2$, wherein $\text{DELTA}_s$ denotes the saturation adjustment value, $\text{DELTA}_h$ denotes the hue adjustment value, and, when the adjustment primary color is one of R, G, and B, $\Delta s_1$ denotes the saturation adjustment amount of the adjustment primary color, $\Delta h_1$ denotes the hue adjustment amount of the adjustment primary color, and $W_1$ denotes the determined weight, or when the adjustment primary color is one of C, M, and Y, $\Delta s_2$ denotes the saturation adjustment amount of the adjustment primary color, $\Delta h_2$ denotes the hue adjustment amount of the adjustment primary color, and $W_2$ denotes the determined weight.

13. The apparatus of claim 12, wherein the component output unit adjusts at least one of the object hue and saturation components using the following equations:

$s_o = s_I + \text{DELTA}_s x (1 - s_I)$ $h_o = \text{DELTA}_h x \theta + h_I$ wherein $s_O$ denotes the object saturation component that has been adjusted, $s_I$ denotes the object saturation component to be adjusted, $h_O$ denotes the object hue component that has been adjusted, and $h_I$ denotes the object hue component to be adjusted.

14. The apparatus of claim 11, wherein the component output unit adjusts a saturation of the object saturation component depending on whether the object saturation component belongs to a low saturation region or a high saturation region.

15. The apparatus of claim 14, wherein the component output unit adjusts the object saturation component depending on whether the object saturation component belongs to the low or high saturation region, using the following equations:

$s_o = s_1 + DELTA_s x (1 - s_I)$, if $s_I < sGP$; or

-continued $$s_o = s_1 + DELTA_s \times (1 - s_1) \times \left(\frac{s_1}{sGP}\right), \text{ if } s_1 \geq sGP$$

wherein $s_O$ denotes the object saturation component that has been adjusted, $s_I$ denotes the object saturation component to be adjusted, $DELTA_s$ denotes the saturation adjustment value, and sGP denotes a predetermined threshold value, where $s_I$<sGP in the low saturation region or $s_I \geq$sGP in the high saturation region.

16. The apparatus of claim 15, wherein the saturation adjustment value $DELTA_s$ is represented as by the following equation:

$$DELTA_s = \Delta s_1 \times W_1 + \Delta s_2 \times W_2,$$

wherein, when the adjustment primary color is one of R, G, and B, $\Delta s_1$ denotes the saturation adjustment amount and $W_1$ denotes the determined weight, or when the adjustment primary color is one of C, M, and Y, $\Delta s_2$ denotes the saturation adjustment amount and $W_2$ denotes the determined weight.

17. A method of adjusting a primary color of an image, comprising:
  determining a weight based on a determined hue difference between a hue of each of plural object hue components and a hue of adjustment primary color; and
  adjusting, using at least one processing device, at least one of object hue and saturation components using at least one of saturation and hue adjustment amounts of the adjustment primary color and the weight,
  wherein the object hue and saturation components are hue and saturation components of an input image belonging to an adjustment range, the adjustment range belongs to a region of a color space in which color interference between the adjustment primary color and a neighboring primary color occurs, the adjustment primary color corresponds to a primary color to be adjusted, and the neighboring primary color corresponds to a primary color neighboring the adjustment primary color,
  wherein, in the determining of the weight, a determined weight based on an absolute value of a first hue difference is determined to affect adjustment of the at least one object hue and saturation components more than an adjustment affect of a determined weight based on an absolute value of a second hue difference when the absolute value of the first hue difference is less than the absolute value of the second hue difference.

18. The method of claim 17, further comprising:
  extracting the hue and saturation components from color information of an input image and selecting the object hue and saturation components from the extracted hue and saturation components.

19. A computer-readable recording medium storing a computer program for controlling an apparatus to perform a method of adjusting saturation and hue components of an input image, the method comprising:
  determining a weight based on a determined hue difference between a hue of each of plural object hue components and a hue of adjustment primary color; and
  adjusting at least one of object hue and saturation components using at least one of saturation and hue adjustment amounts of the adjustment primary color and the weight,
  wherein the object hue and saturation components are hue and saturation components of an input image belonging to an adjustment range, the adjustment range belongs to a region of a color space in which color interference between the adjustment primary color and a neighboring primary color occurs, the adjustment primary color corresponds to a primary color to be adjusted, and the neighboring primary color corresponds to a primary color neighboring the adjustment primary color,
  wherein, in the determining of the weight, a determined weight based on an absolute value of a first hue difference is determined to affect adjustment of the at least one object hue and saturation components more than an adjustment affect of a determined weight based on an absolute value of a second hue difference when the absolute value of the first hue difference is less than the absolute value of the second hue difference.

20. The computer-readable recording medium of claim 19, wherein method further includes:
  extracting the hue and saturation components from color information of the input image and selecting the object hue and saturation components from the extracted hue and saturation components.

21. An apparatus for preventing color representation error when an object saturation of an input image is achromatic or has a neighboring value, comprising:
  a weight determiner which determines a weight based on a determined hue difference between a hue of each of plural object hue components and a hue of an adjustment primary color; and
  a component adjuster which adjusts at least one of the object hue components and a saturation component using at least one of a saturation adjustment amount and a hue adjustment amount of the at least one adjustment primary color and the weight,
  wherein the object hue and saturation components are hue and saturation components of an input image belonging to an adjustment range of a region of a color space in which color interference between the adjustment primary color and a neighboring primary color occurs, the adjustment primary color corresponds to a primary color to be adjusted, and the neighboring primary color corresponds to a primary color neighboring the adjustment primary color,
  wherein, in the determining of the weight, a determined weight based on an absolute value of a first hue difference is determined to affect adjustment of the at least one object hue components and the saturation component more than an adjustment affect of a determined weight based on an absolute value of a second hue difference when the absolute value of the first hue difference is less than the absolute value of the second hue difference.

* * * * *

UNITED STATES PATENT AND TRADEMARK OFFICE
CERTIFICATE OF CORRECTION

| | |
|---|---|
| PATENT NO. | : 7,646,393 B2 |
| APPLICATION NO. | : 11/118482 |
| DATED | : January 12, 2010 |
| INVENTOR(S) | : Wonhee Choe et al. |

It is certified that error appears in the above-identified patent and that said Letters Patent is hereby corrected as shown below:

Title Pg, Item (75) Inventors: change "Gyeongiu-si (KR);" to --Gyeongju-si (KR);--.

Signed and Sealed this

Thirteenth Day of April, 2010

David J. Kappos
*Director of the United States Patent and Trademark Office*